US010556980B2

(12) United States Patent
Benicewicz et al.

(10) Patent No.: US 10,556,980 B2
(45) Date of Patent: *Feb. 11, 2020

(54) POLY ALKYL (METH)ACRYLATES GRAFTED NANOPARTICLES AND THEIR METHODS OF MANUFACTURE AND USE

(71) Applicant: University of South Carolina, Columbia, SC (US)

(72) Inventors: Brian C. Benicewicz, Columbia, SC (US); Mohammad Mohammadkhani, Columbia, SC (US); Junting Li, Columbia, SC (US)

(73) Assignee: University of South Carolina, Columbia, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/636,468

(22) Filed: Mar. 3, 2015

(65) Prior Publication Data

US 2015/0266990 A1 Sep. 24, 2015

Related U.S. Application Data

(60) Provisional application No. 61/946,956, filed on Mar. 3, 2014.

(51) Int. Cl.
| C08F 292/00 | (2006.01) |
| C08L 23/06 | (2006.01) |
| C08L 23/12 | (2006.01) |
| C08L 33/04 | (2006.01) |
| C08L 33/10 | (2006.01) |
| C08L 51/10 | (2006.01) |

(52) U.S. Cl.
CPC ............ C08F 292/00 (2013.01); C08L 23/06 (2013.01); C08L 23/12 (2013.01); C08L 33/04 (2013.01); C08L 33/10 (2013.01); C08L 51/10 (2013.01); C08L 2207/066 (2013.01)

(58) Field of Classification Search
CPC .......................... C08F 292/00; C08F 290/148
See application file for complete search history.

(56) References Cited

U.S. PATENT DOCUMENTS

| 5,973,086 | A | * | 10/1999 | Baskaran | ................ | C08F 4/565 526/174 |
| 7,311,943 | B2 | | 12/2007 | Jacobson et al. | | |
| 8,206,747 | B2 | | 6/2012 | Zale et al. | | |
| 8,865,796 | B2 | * | 10/2014 | Benicewicz | .......... | C08F 292/00 523/201 |
| 9,109,070 | B2 | * | 8/2015 | Benicewicz | .......... | C08F 292/00 |
| 9,249,250 | B2 | | 2/2016 | Benicewicz et al. | | |
| 2003/0199653 | A1 | | 10/2003 | McCormick et al. | | |
| 2005/0027040 | A1 | * | 2/2005 | Nelson | .................. | B82Y 30/00 523/216 |
| 2008/0085975 | A1 | * | 4/2008 | Saegusa | ................ | C08F 283/12 525/63 |
| 2010/0227162 | A1 | * | 9/2010 | Patil | ....................... | B82Y 30/00 428/338 |
| 2011/0182996 | A1 | | 7/2011 | Fukushima et al. | | |
| 2012/0112131 | A1 | * | 5/2012 | Li | .......................... | C09C 1/3669 252/500 |
| 2012/0277378 | A1 | * | 11/2012 | Nelson | .................. | B82Y 30/00 525/65 |
| 2013/0041112 | A1 | * | 2/2013 | Benicewicz | .......... | C08F 292/00 525/342 |
| 2015/0315298 | A1 | | 11/2015 | Benicewicz et al. | | |
| 2015/0344678 | A1 | | 12/2015 | Benicewicz et al. | | |
| 2016/0024234 | A1 | | 1/2016 | Wang et al. | | |
| 2016/0159960 | A1 | | 6/2016 | Benicewicz et al. | | |

FOREIGN PATENT DOCUMENTS

WO WO2013/078309 A1 5/2013

OTHER PUBLICATIONS

Du Pont R-960 flyer, 2007.*
Duchene et al.; "Cyclodextrins in targeting Application to nanoparticles," *Advanced Drug DelivePy Reviews* 36 (1999) 29-40.

* cited by examiner

Primary Examiner — Irina Krylova
(74) Attorney, Agent, or Firm — Dority & Manning, P.A.

(57) ABSTRACT

Methods for synthesizing a polymer functionalized nanoparticle are provided. The method can include attaching a polymeric chain to a nanoparticle, wherein the polymeric chain comprises a plurality monomers, wherein the plurality of monomers comprise alkyl (meth)acrylate monomers. Polymer functionalized nanoparticles are also provided that comprise a nanoparticle defining a surface, and a polymeric chain covalently bonded to the surface of the nanoparticle, wherein the polymeric chain comprises a poly alkyl (meth) acrylate. Nanocomposites are also provided that include a plurality of these polymer functionalized nanoparticles dispersed within a polymeric matrix (e.g., a polyolefin matrix).

13 Claims, 7 Drawing Sheets

US 10,556,980 B2

POLY ALKYL (METH)ACRYLATES GRAFTED NANOPARTICLES AND THEIR METHODS OF MANUFACTURE AND USE

PRIORITY INFORMATION

The present application claims priority to U.S. Provisional Patent Application Ser. No. 61/946,956 titled "Poly Alkyl (Meth)Acrylates Grafted Nanoparticles and Their Methods of Manufacture and Use" of Benicewicz, et al. filed on Mar. 3, 2014, the disclosure of which is incorporated by reference herein.

BACKGROUND

Polyolefins such as polyethylene and polypropylene are widely used in industry for packaging, plastic films, containers, bottles and automotive components. Their excellent chemical resistance, electrical insulation, toughness and flexibility make them extremely important in industry.

Nanocomposites of polyolefins with nanoscale inorganic fillers are potentially of great importance as the presence of dispersed nanoparticles can improve their properties (such as mechanical strength or thermal stability) which cannot be obtained by a simple macroscopic mixing of polymer with bulk inorganic materials. However, obtaining a high degree of dispersion of inorganic nanoparticles in a polyolefin matrix has always been a challenge. It has been demonstrated that the surface functionalization of inorganic nanoparticles with polymer brushes (especially polymers of the same type as the nanocomposite matrix) can drastically improve the dispersion of nanoparticles within the matrix.

Inorganic nanoparticles with huge surface area and low cost have been widely used to reinforce polyolefin composites, such as their heat resistance, low strength, optical properties, etc. However, the fabrication of polyolefin-like functionalized inorganic nanoparticles is a major challenge. Free radical polymerization is unable to synthesize polyolefins with control over molecular weight and polydispersity. With controlled radical polymerization (CRP) techniques, control over chemical composition, grafting density, molecular weight, molecular architecture, and polydispersity can be achieved. However, most of the CRP methods do not allow polymerization of polyolefins on the surface of nanoparticles, such as polyethylene and polypropylene.

As such, a need exists for an improved polyolefin nanocomposite with good dispersion of nanoparticles at both high and low nanoparticle loading.

SUMMARY

Objects and advantages of the invention will be set forth in part in the following description, or may be obvious from the description, or may be learned through practice of the invention.

Methods are generally provided for synthesizing a polymer functionalized nanoparticle. In one embodiment, the method includes attaching a polymeric chain to a nanoparticle, wherein the polymeric chain comprises a plurality monomers, wherein the plurality of monomers comprise alkyl (meth)acrylate monomers.

For example, the polymeric chain can be attached to the nanoparticle by attaching an anchoring compound to the nanoparticle and then polymerizing a plurality of the monomers on the anchoring compound to form the polymeric chain covalently bonded to the nanoparticle via the anchoring compound. Alternatively, the polymeric chain can be attached to the nanoparticle by attaching the polymeric chain to a surface of a nanoparticle, wherein the polymeric chain comprises a poly alkyl (meth)acrylate formed from polymerization of the plurality of monomers prior to attachment to the nanoparticle.

Polymer functionalized nanoparticles are also generally provided that comprise a nanoparticle defining a surface, and a polymeric chain covalently bonded to the surface of the nanoparticle, wherein the polymeric chain comprises a poly alkyl (meth)acrylate.

Nanocomposites are also generally provided that include a plurality of these polymer functionalized nanoparticles dispersed within a polymeric matrix (e.g., a polyolefin matrix).

Other features and aspects of the present invention are discussed in greater detail below.

BRIEF DESCRIPTION OF THE DRAWINGS

A full and enabling disclosure of the present invention, including the best mode thereof to one skilled in the art, is set forth more particularly in the remainder of the specification, which includes reference to the accompanying figures.

DEFINITIONS

Figure 1A:
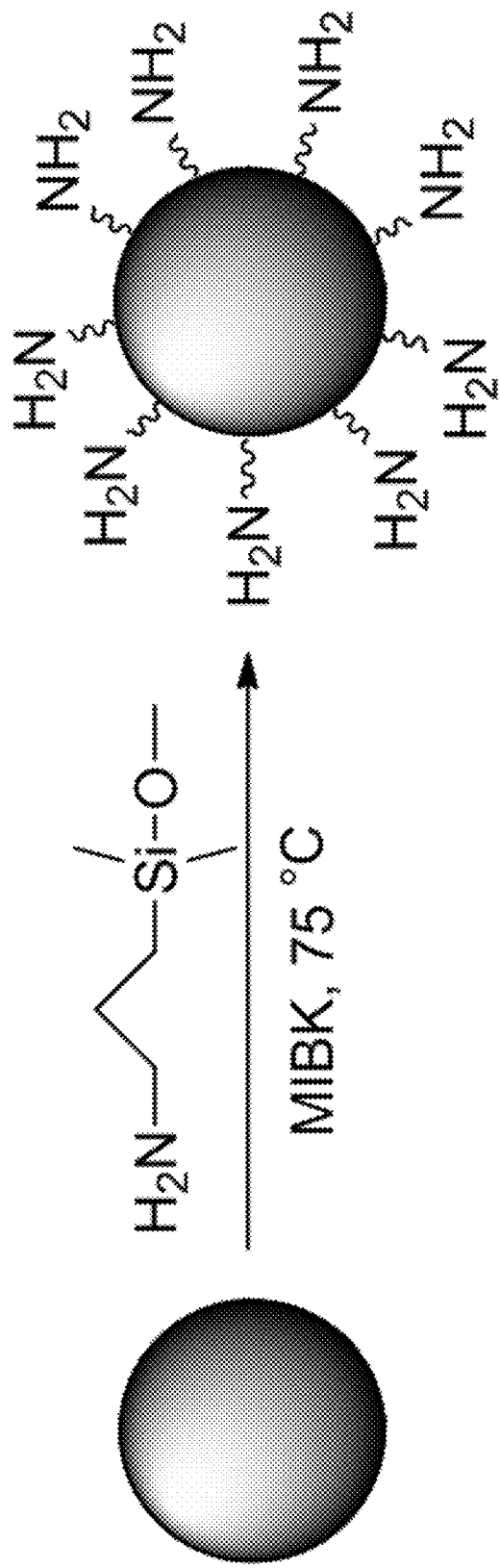
FIG. 1A shows a reaction illustration of an exemplary method of formation of an amino-functional nanoparticle.

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth.

As used herein, the prefix "nano" refers to the nanometer scale (e.g., from about 1 nm to about 999 nm). For example, particles having an average diameter on the nanometer scale (e.g., from about 1 nm to about 999 nm) are referred to as "nanoparticles". Particles having an average diameter of greater than 1,000 nm (i.e., 1 μm) are generally referred to as "microparticles", since the micrometer scale generally involves those materials having an average size of greater than 1 μm.

As used herein, the term "polymer" generally includes, but is not limited to, homopolymers; copolymers, such as, for example, block, graft, random and alternating copolymers; and terpolymers; and blends and modifications thereof. Furthermore, unless otherwise specifically limited, the term "polymer" shall include all possible geometrical configurations of the material. These configurations include, but are not limited to isotactic, syndiotactic, and random symmetries.

The term "organic" is used herein to refer to a class of chemical compounds that are comprised of carbon atoms. For example, an "organic polymer" is a polymer that includes carbon atoms in the polymer backbone, but may also include other atoms either in the polymer backbone and/or in side chains extending from the polymer backbone (e.g., oxygen, nitrogen, sulfur, silicon, etc.).

The "number average molecular weight" ($M_n$) is readily calculated by one of ordinary skill in the art, and generally refers to the ordinary arithmetic mean or average of the molecular weights of the individual macromolecules. It is determined by measuring the molecular weight of n polymer molecules, summing the weights, and dividing by n, such as represented in the formula:

$$\overline{M}_n = \frac{\sum_i N_i M_i}{\sum_i N_i}$$

where $N_i$ is the number of molecules of molecular weight $M_i$. The number average molecular weight of a polymer can be determined by gel permeation chromatography, and all colligative methods, like vapor pressure osmometry or end-group determination.

The "weight average molecular weight" ($M_w$) is readily calculated by one of ordinary skill in the art, and generally refers to:

$$\overline{M}_w = \frac{\sum_i N_i M_i^2}{\sum_i N_i M_i}$$

where $N_i$ is the number of molecules of molecular weight $M_i$. The weight average molecular weight can be determined by light scattering, small angle neutron scattering (SANS), X-ray scattering, gel permeation chromatography, and sedimentation velocity.

The polydispersity index (PDI) is a measure of the distribution of molecular mass in a given polymer sample. The PDI calculated is the weight average molecular weight divided by the number average molecular weight. It indicates the distribution of individual molecular masses in a batch of polymers. The PDI has a value equal to or greater than 1, but as the polymer chains approach uniform chain length, the PDI approaches unity (i.e., 1).

As used herein the grafting density ($\sigma$) is stated in terms of chain density (chain/nm$^2$) calculated from the corresponding weight loss ratio determined by thermal gravimetric analysis (TGA), the number of grafting chains, and surface area of nanoparticles using:

$\sigma = (wN_A/M_n)/(4\pi\alpha^2 n) = apzN_A \times 10^{-21}/3(1-z)M_n$ where w is the weight of organic polymers, $N_A$ is Avogadro's number, n is the number of nanoparticles, and z is the weight loss of polymer chains. Grafting density can also be determined by UV-Vis spectroscopy methods.

DETAILED DESCRIPTION

Reference now will be made to the embodiments of the invention, one or more examples of which are set forth below. Each example is provided by way of an explanation of the invention, not as a limitation of the invention. In fact, it will be apparent to those skilled in the art that various modifications and variations can be made in the invention without departing from the scope or spirit of the invention. For instance, features illustrated or described as one embodiment can be used on another embodiment to yield still a further embodiment. Thus, it is intended that the present invention cover such modifications and variations as come within the scope of the appended claims and their equivalents. It is to be understood by one of ordinary skill in the art that the present discussion is a description of exemplary embodiments only, and is not intended as limiting the broader aspects of the present invention, which broader aspects are embodied exemplary constructions.

Methods are generally provided for grafting poly(meth)acrylates on inorganic nanoparticles via surface-initiated CRP methods, such as reversible addition-fragmentation chain-transfer (RAFT) polymerization in a controlled manner. Monomers can be polymerized through this method including but not limited to (meth)acrylate with long side chains (e.g., having a chain length of 8 to 18 carbons).

Long side chain poly-alkyl (meth)acrylates are low-$T_g$ polyolefin-like polymers that can be synthesized via CRP methods. Their copolymers with ethylene, vinyl acetate, etc. are used extensively. For example, copolymers containing stearyl methacrylate (SMA) are coated on material surfaces to improve water repellency and soil resistance, or function as oil-absorptive polymers resulting from their hydrophobic properties. Moreover, poly(stearyl methacrylate) (PSMA) and their mixtures with olefinic copolymers or styrene based copolymers are used extensively as viscosity index improvers and pour-point depressants for lubricating oil because of their superior viscosity index character, their structural diversity, ease of modification and economic considerations. Despite the practical significance of these polymers, research on CRP of the long side chain (meth)acrylates in surface-initiated CRP has not been reported.

After formation, the resulting poly alkyl (meth)acrylates-grafted nanoparticles can be mixed with polyalkylenes (e.g., linear low density polyethylene (LLDPE), low density polyethylene (LDPE), or polypropylene (atactic, syndiotactic, or isotactic) matrices) in a dilute toluene solution or other appropriate solvents. This mixture can then be used to cast films and/or anneal them. Alternatively, the resulting the poly alkyl (meth)acrylates-grafted nanoparticles can be melt mixed with such polyalkylenes. Such nanocomposites can be formed without gross agglomeration of the nanoparticles within the resulting polymer matrix, due to the presence of the poly alkyl (meth)acrylate chains extending from the surface of the nanoparticles.

An advantage of this method is that high-molecular-weight polymers (e.g., up to 200 kg/mol) can be grafted-to or grafted-from the nanoparticles, which is important for industrial applications.

I. Nanoparticles:

The presently disclosed methods can be utilized on a variety of different types of nanoparticles. The nanoparticle may comprise, for example, natural or synthetic nanoclays (including those made from amorphous or structured clays), inorganic metal oxides (e.g., silica, alumina, and the like), nanolatexes, organic nanoparticles, etc. Particularly suitable nanoparticles include inorganic nanoparticles, such as silica, alumina, titania (TiO$_2$), barium titanate, indium tin oxide (ITO), CdSe, etc., or mixtures thereof. Suitable organic nanoparticles include polymer nanoparticles, carbon, graphite, graphene, carbon nanotubes, virus nanoparticles, etc., or mixtures thereof.

Nanoparticles, as used herein, means particles (including but not limited to rod-shaped particles, disc-shaped particles, platelet-shaped particles, tetrahedral-shaped particles), fibers, nanotubes, or any other materials having at least one dimension on the nano scale. In one embodiment, the nanoparticles have an average particle size of about 1 nanometer to about 1000 nanometers, preferably 2 nanometers to about 750 nanometers. That is, the nanoparticles have a dimension (e.g., an average diameter or length) of about 1 to 1000 nm. Nanotubes can include structures up to 1 centimeter long, alternatively with a particle size from about 2 to about 50 nanometers. Due to their size, nanoparticles have very high surface-to-volume ratios.

The nanoparticles may be crystalline or amorphous. A single type of nanoparticle may be used, or mixtures of different types of nanoparticles may be used. If a mixture of nanoparticles is used they may be homogeneously or non-homogeneously distributed in the composite material or a system or composition containing the composite material. Non-limiting examples of suitable particle size distributions of nanoparticles are those within the range of about 2 nm to less than about 750 nm, alternatively from about 2 nm to less than about 200 nm, and alternatively from about 2 nm to less than about 150 nm.

It should also be understood that certain particle size distributions may be useful to provide certain benefits, and other ranges of particle size distributions may be useful to provide other benefits (for instance, color enhancement requires a different particle size range than the other properties). The average particle size of a batch of nanoparticles may differ from the particle size distribution of those nanoparticles. For example, a layered synthetic silicate can have an average particle size of about 25 nanometers while its particle size distribution can generally vary between about 10 nm to about 40 nm.

In one embodiment, the nanoparticles can be exfoliated from a starting material to form the nanoparticles. Such starting material may have an average size of up to about 50 microns (50,000 nanometers). In another embodiment, the nanoparticles can be grown to the desired average particle size.

II. Attaching an Anchoring Compound to the Nanoparticle:

In certain embodiments, an anchoring compound can be attached to the surface of the nanoparticle for subsequent attachment of the polymeric chain (e.g., via a "grafting-from" or "grafting-to" approach, as described in greater detail below). The anchoring compound is covalently bonded to the surface of the nanoparticle, either directly or via a functionalization group.

The particular anchoring compound can be selected based upon the type of nanoparticle. Generally, the anchoring compound has a functional group for further reaction to the polymer chain.

For example, referring to the first reaction step shown in FIG. 1A an anchoring compound having an amino-functionalization is shown attached to the surface of a nanoparticle (represented by the sphere). In one embodiment, the amino-functionalization of the nanoparticles (i.e., attachment of amine groups to the nanoparticles) can be achieved through reaction of the nanoparticles with a mono-functional silane anchoring compound (e.g., 3-aminopropyldimethylmethoxysilane or 3-aminopropyldimethylethoxysilane). Use of a mono-functional silane as the anchoring compound, such as 3-aminopropyldimethylmethoxysilane or 3-aminopropyldimethylethoxysilane, compared to a difunctional or tri-functional silanes ensures the formation of a monolayer of anchoring agent on the silica surface and helps to prevent particle agglomeration by crosslinking during processing. However, mono-functional, di-functional, and tri-functional silanes are all suitable for use as an anchoring compound in the presently disclosed methods.

No matter the particular silane (i.e., mono-functional, di-functional, or tri-functional, etc.), the ratio of the silane to the nanoparticles is critical in determining the grafting density. In addition to adjusting the ratio by varying the concentration of the mono-functional silane, addition of a small amount of an inert dimethylmethoxy-n-octylsilane (or other alkoxy-alkyl silanes) can help to partially cover the nanoparticle surface by inert alkyl groups and to help tune the grafting density along with helping to prevent aggregation of the nanoparticles. In addition to silanes, phosphates or their esters, phosphonates or their esters, and carboxylic acids can be used to bind to the nanoparticles surface.

III. Attaching a Poly alkyl (meth)acrylate Chain to the Anchoring Compound:

Two methods can be utilized to form the poly alkyl (meth)acrylate chains extending from the nanoparticles via the anchoring compounds: a "grafting-from" approach and a "grafting-to" approach. These strategies will be explained in more details in the following sections.

In one embodiment, monomers can be polymerized through this method including but not limited to alkyl (meth)acrylate with long side chains (e.g., 8-18 carbons), either linear or branched side chains. For example, alkyl (meth)acrylate monomers having a linear side chain can be generally represented according to Formula 1, shown below:

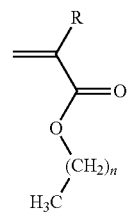

Formula 1 where R is H (i.e., an acrylate monomer) or $CH_3$ (i.e., a methacrylate monomer), and n is 7 to 17 (indicating that the total carbon chain length is 6 to 18). Particularly suitable (meth)acrylate monomers can be poly octyl methacrylate (8 carbon chain), lauryl methacrylate (12 carbon chain), stearyl methacrylate (18 carbon chain), or mixtures thereof.

The polymerization temperature can be varied based on the particular monomer and other conditions. However, in most embodiments, the polymerization temperature is about 60° C. to about 100° C., such as about 60° C. to about 80° C.

Other polymerization conditions can be varied to accommodate the particular alkyl (meth)acrylate monomer utilized. For example, many common solvents can be used, such as toluene, THF, chlorinated solvents, although it has been found that mixtures of solvents (such as toluene/THF) are sometimes more beneficial than a single solvent. As such, in particular embodiments, a solvent system comprising at least two compatible solvents can be utilized.

Figure 1B:
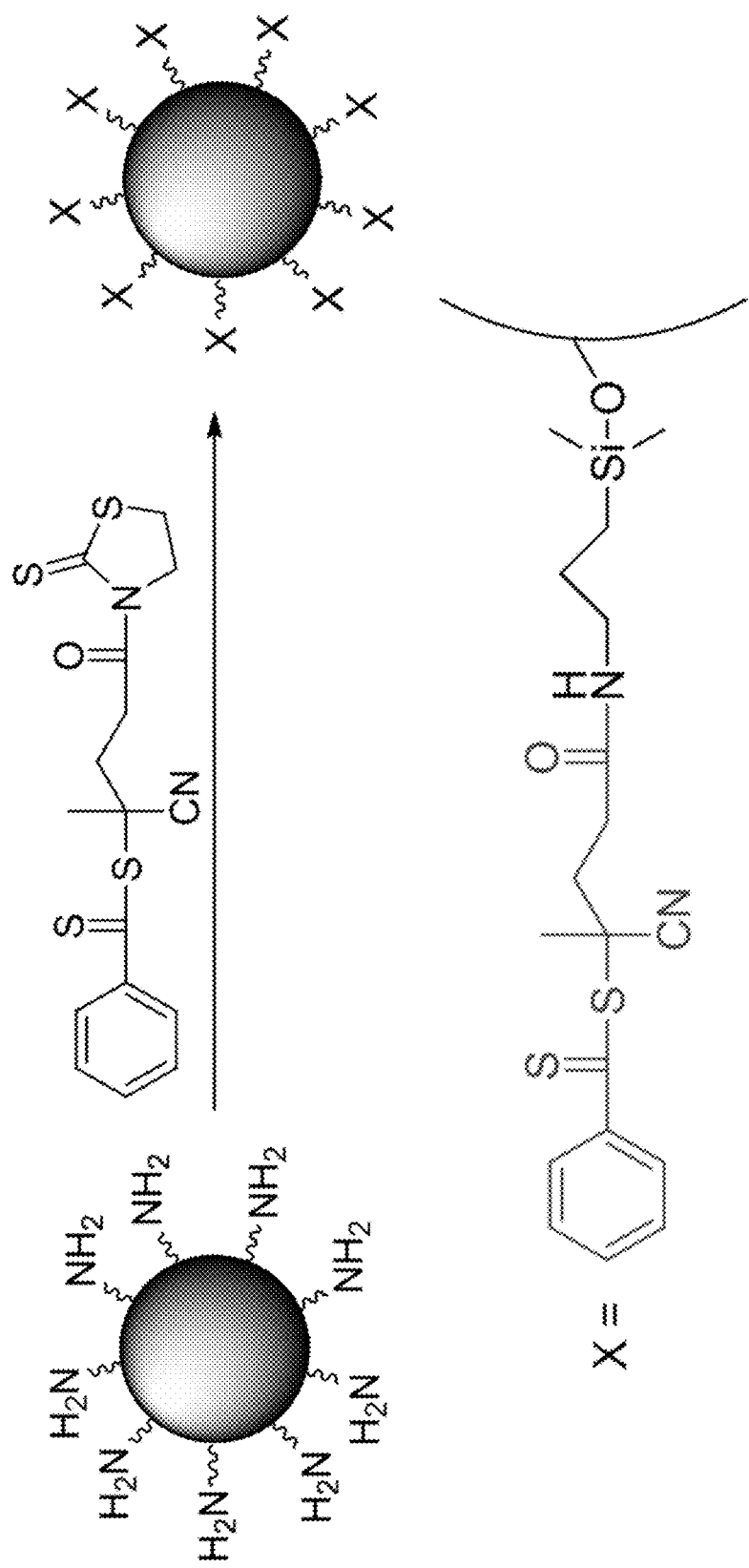
FIG. 1B shows a schematic illustration of an exemplary method of surface functionalization of amino-functional nanoparticles with a dithioester RAFT agent for surface-initiated RAFT polymerization of alkyl (meth)acrylate monomers.

In one embodiment, to prepare poly alkyl (meth)acrylate-derived polymer grafted nanoparticles, RAFT agents are employed for the polymerization of alkyl (meth)acrylate monomers ascribed to control the polymerization on the surface of the nanoparticle. Thus, a dithioester RAFT agent is utilized as an anchoring compound for attaching a alkyl (meth)acrylate-derived polymer chain to the nanoparticle. For example, 4-cyano-pentanoic acid dithiobenzoate (CPDB) can be attached to the surface of the nanoparticle through the anchoring compound, as shown in FIG. 1B, following activation. Other suitable RAFT agents can be utilized, including those RAFT agents in any of the RAFT classes (e.g., xanthates, dithiocarbamates, trithiocarbonates, and dithioesters) that are stable in the solution at the reaction temperature.

CPDB can be activated by reaction with 2-mercaptothiazoline to form activated CPDB (i.e., CPDB having its carboxylic acid functional group replaced with a 2-mercaptothiazoline-containing functional group, shown in FIG. 1B). Then, the activated CPDB anchoring compound can be attached on the surface of the nanoparticles. Depending on the composition of the nanoparticle, its surface may be first functionalized with amine groups (e.g., as described above using a mono-functional silane such as 3-aminopropyldimethylethoxysilane) via attachment of an anchoring compound. Alternatively, a phosphorus linkage can be utilized between the surface of the nanoparticle and the RAFT agent, such as described in International Patent Publication No. WO 2013078309 A1 (serial no. PCT/US2012/066254) of Benicewicz, et al. titled "Silicone based nanocomposites including inorganic nanoparticles and their methods of manufacture and use," which is incorporated by reference herein.

To attach the RAFT agent onto the anchoring compound of the nanoparticle, the activated CPDB is immobilized onto the surface of the nanoparticle via a condensation reaction with the amine groups of the shown anchoring compound on the nanoparticle's surface. Using this approach, various CPDB-functionalized nanoparticles can be synthesized having a grafting density varying from 0.01-0.7 anchoring compounds/nm$^2$. An inherent advantage of this technique compared to the other "grafting-from" methods is the ease and accuracy in measuring the grafting density before carrying out the polymerization. The CPDB molecule is UV-VIS active and hence by comparing the absorption at 302 nm from the CPDB-functionalized nanoparticles to a standard absorption curve made from known amounts of free CPDB, the concentration of the anchoring compounds attached onto the nanoparticles can be calculated. Knowledge of the concentration of the anchoring compounds attached onto the nanoparticles before the reaction provides the reaction with control and predictability, which is the key to controlling molecular weight and molecular weight distribution.

A. "Grafting-From" Methods

In one embodiment, the poly alkyl (meth)acrylate chain can be formed by polymerizing a plurality of monomers on the anchored RAFT agent attached to the anchoring compound on the surface of the nanoparticle, with the plurality of monomers comprising (meth)acrylate monomers. This polymerization results in the polymeric chain (of poly alkyl (meth)acrylate) being covalently bonded to the surface of the nanoparticle via the anchoring compound. According to this method, the polymerization of the polymeric chain can be conducted through RAFT polymerization using any suitable type of RAFT agent, such as xanthates, dithioesters, dithiocarbamates, and trithiocarbonates.

The particular types of monomer(s) and/or RAFT agent can be selected based upon the desired polymeric chain to be formed. For example, monomers containing alkyl (meth) acrylate monomers can be polymerized either alone (i.e., substantially free from any other types of monomers) or in combination with a co-monomer.

Thus, the "grafting-from" method involves formation of the polymeric chain onto the anchoring compound and results in the polymeric chain (of poly alkyl (meth)acrylate) being covalently bonded to the nanoparticle via the anchoring compound (and, if present, a first functionalization compound).

B. "Grafting-To" Methods

Alternatively, the polymeric chain can be first polymerized and subsequently covalently bonded to the surface of the nanoparticle, either directly or via an anchoring compound (and, if present, a functionalization compound). Thus, in this embodiment, the polymeric chain has been polymerized prior to attachment to the anchoring compound.

In this embodiment, the polymeric chain is not limited to the type of polymerization and/or types of monomer(s) capable of being polymerized directly to the anchoring compound. As such, as long as the polymeric chain contains a functional group that can react and bond to the anchoring compound, any polymeric chain can be bonded to the nanoparticle.

IV. Polymerization Techniques

As stated, the polymeric chain of poly alkyl (meth) acrylate can be formed via controlled polymerizations, such as controlled living polymerizations (CLPs) via the RAFT technique. Through the use of these controlled polymerizations, the polymeric chains can be produced with low polydispersity. Thus, these methods are ideal for block polymer and/or graft polymer synthesis.

Controlled living polymerization generally refers to chain growth polymerization which proceeds with significantly suppressed termination or chain transfer steps. Thus, polymerization in CLP proceeds until all monomer units have been consumed or until the reaction is terminated (e.g., through quenching and/or deactivating), and the addition of monomer results in continued polymerization, making CLP ideal for block polymer and graft polymer synthesis. The molecular weight of the resulting polymer is generally a linear function of conversion so that the polymeric chains are initiated and grow substantially uniformly. Thus, CLPs provide precise control on molecular structures, functionality and compositions. Thus, these polymers can be tuned with desirable compositions and architectures.

A. Reversible Addition-Fragmentation Chain Transfer Polymerization

Reversible Addition-Fragmentation chain Transfer polymerization (RAFT) is one type of controlled radical polymerization. RAFT polymerization uses thiocarbonylthio compounds, such as dithioesters, dithiocarbamates, trithiocarbonates, and xanthates, in order to mediate the polymerization via a reversible chain-transfer process. RAFT polymerization can be performed by simply adding a chosen quantity of appropriate RAFT agents (thiocarbonylthio compounds) to a conventional free radical polymerization. RAFT polymerization is particularly useful with monomers having a vinyl functional group (e.g., a (meth)acrylate group).

Typically, a RAFT polymerization system includes the monomer, an initiator, and a RAFT agent (also referred to as a chain transfer agent). Because of the low concentration of the RAFT agent in the system, the concentration of the initiator is usually lower than in conventional radical polymerization. Suitable radical initiators can be azobisisobutyronitrile (AIBN), 4,4'-azobis(4-cyanovaleric acid) (ACVA), etc.

RAFT agents are generally thiocarbonylthio compounds, such as generally shown in the Formula below:

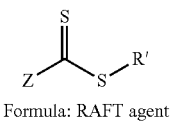

Formula: RAFT agent where the Z group primarily stabilizes radical species added to the C=S bond and the R' group is a good homolytic leaving group which is able to initiate monomers. For example, the Z group can be an alkyl group, an aryl group (e.g., phenyl group, benzyl group, etc.), a thiol group (e.g., R—S—, with R being H or any suitable organic group, such as alkyl, aryl, etc), an amine group (e.g., $R_2N$—, with each R group being independently H or any suitable organic group, such as alkyl, aryl, etc), an oxy group (R—O—, with R being any suitable organic group, such as alkyl, aryl, etc), etc. The R' group can be an organic chain terminating with a carboxylic acid group, a carboxylic derivative, an alkyne group, an azide group, an alcohol group, an alkene group, or another group that is reactive with the functional group of the particular anchoring compound attached to the nanoparticle. That is, in one particular embodiment, the functional group of the anchoring compound present on the nanoparticle is reactive with the R' group of the RAFT agent to ensure sufficient covalent bonding there between.

As stated, RAFT is a type of living polymerization involving a conventional radical polymerization in the presence of a reversible chain transfer reagent. Like other living radical polymerizations, there is minimized termination step in the RAFT process. The reaction is started by radical initiators (e.g., AIBN). In this initiation step, the initiator reacts with a monomer unit to create a radical species which starts an active polymerizing chain. Then, the active chain reacts with the thiocarbonylthio compound, which kicks out the homolytic leaving group (R'). This is a reversible step, with an intermediate species capable of losing either the leaving group (R') or the active species. The leaving group radical then reacts with another monomer species, starting another active polymer chain. This active chain is then able to go through the addition-fragmentation or equilibration steps. The equilibration keeps the majority of the active propagating species into the dormant thiocarbonyl compound, limiting the possibility of chain termination. Thus, active polymer chains are in equilibrium between the active and dormant species. While one polymer chain is in the dormant stage (bound to the thiocarbonyl compound), the other is active in polymerization.

By controlling the concentration of initiator and thiocarbonylthio compound and/or the ratio of monomer to thiocarbonylthio compound, the molecular weight of the polymeric chains can be controlled with low polydispersities.

Depending on the target molecular weight of final polymers, the monomer to RAFT agent ratios can range from about less than about 10 to more than about 10000 (e.g., about 10 to about 1,500). Other reaction parameters can be varied to control the molecular weight of the final polymers, such as solvent selection, reaction temperature, and reaction time. For instance, solvents can include conventional organic solvents such as tetrahydrofuran, toluene, dimethylformamide, anisole, acetonitrile, dichloromethane, etc or mixtures of solvents. The reaction temperature can range from room temperature (e.g., about 20° C.) to about 120° C. The reaction time can be from less than about 1 h to about 48 h.

The RAFT process allows the synthesis of polymers with specific macromolecular architectures such as block, gradient, statistical, comb/brush, star, hyperbranched, and network copolymers.

Because RAFT polymerization is a form of living radical polymerization, it is ideal for synthesis of block copolymers. For example, in the copolymerization of two monomers (A and B) allowing A to polymerize via RAFT will exhaust the monomer in solution with significantly suppressed termination. After monomer A is fully reacted, the addition of monomer B will result in a block copolymer. One requirement for maintaining a narrow polydispersity in this type of copolymer is to have a chain transfer agent with a high transfer constant to the subsequent monomer (monomer B in the example).

Using a multifuntional RAFT agent can result in the formation of a star copolymer. RAFT differs from other forms of CLPs because the core of the copolymer can be introduced by functionalization of either the R group or the Z group. While utilizing the R group results in similar structures found using ATRP or NMP, the use of the Z group makes RAFT unique. When the Z group is used, the reactive polymeric arms are detached from the core while they grow and react back into the core for the chain-transfer reaction.

V. Deactivating the alkyl (meth)acrylate-Derived Polymer Chain:

No matter the method used to attach the polymeric chain to anchoring compound on the nanoparticle, upon attachment, the polymeric chain is, in one particular embodiment, deactivated to prevent further polymerization thereon.

For example, if the "grafting-from" method was utilized to attach the polymeric chain to the anchoring compound via RAFT polymerization, a deactivation agent can be attached to or reacted with the end of each polymeric chain to inhibit further polymerization thereon. The deactivation agents can be selected based upon the type of polymerization and/or the type(s) of monomers utilized, but can generally include but are not limited to amines, peroxides, or mixtures thereof.

On the other hand, if the "grafting-to" method was utilized to attach the polymeric chain to the anchoring compound via attaching a pre-formed polymeric chain, the polymeric chain can be deactivated after or before covalently bonding the polymeric chain to the anchoring compound. Alternatively, the polymeric chain can be deactivated prior to covalently bonding the polymeric chain to the anchoring compound.

The deactivation of the polymeric chain can be achieved by any suitable process. In one embodiment, the polymer chain can be cleaved. Alternatively, the end of the polymer chain can be deactivated. For example, when formed via RAFT polymerization, the types of reactions that can be used to convert RAFT agents to deactivated end groups include reactions with diazo compounds, reactions with nucleophilic reagents such as primary amines, and reactions with oxidation agents which cleave the RAFT agent off the chain end and form an oxidized sulfur group such as sulfonic acid.

VI. Additional Polymeric Chains

If desired, in particular embodiments, a second set of polymeric chains can be grafted to the surface of the nanoparticles, as set forth in U.S. Patent Publication No. 2013/0041112 of Benicewicz, et al. titled "Nanoparticles with Multiple Attached Polymer Assemblies and Use Thereof in Polymer Composites," which is incorporated by reference herein.

VII. Polymer Functionalized Nanoparticles

Through these methods, a polymer functionalized nanoparticle is formed that has a polymeric chain covalently bonded to the surface of the nanoparticle, with the polymeric chain comprising a poly alkyl (meth)acrylate.

The number average molecular weight of the resulting poly alkyl (meth)acrylate chains can be, in particular embodiments, about 2,000 to about 300,000, such as about 5000 to about 150,000. The polydispersity of the resulting poly alkyl (meth)acrylate chains can be, in particular embodiments, relatively small, such as about 1.1 to about 2.0. However, in other embodiments, the polydispersity can be larger if desired for the particular end applications. For example, there are some applications where you would want to make this broader, and appropriate selection of the RAFT agent could result in a larger polydispersity.

VII. Polymeric Nanocomposites

Finally, the poly alkyl (meth)acrylate functionalized nanoparticles can be mixed with a polymeric matrix and further processed into a nanocomposite. The polymeric materials may include, but are not limited to, polyolefins (e.g., polyethylene, polypropylene, etc.), polymeric rubber materials (e.g., natural rubber, butadiene based rubbers, nitrile rubbers (e.g., NBR), styrene-butadiene rubber (SBR), ethylene-propylene-diene monomer (EPDM) materials, butyl rubber, etc.), polychloroprenes, polynorbornenes, etc, or mixtures thereof.

Mixing can be accomplished by simple mixing of the components when at least one of the components is a liquid, or by dissolving the components in a solvent for the components and removing the solvent at a later time. Mixing can also be accomplished without a solvent, such as via melt mixing methods.

The poly alkyl (meth)acrylate chains functionalized nanoparticles can be loaded within matrix in an amount, if desired, such as about 25 wt. % to 60 wt. % (e.g., about 35 wt. % to about 50 wt. %) of the total weight of the resulting nanocomposite. Such loading can be, in one embodiment, with substantially uniform dispersion of the nanoparticles within the polymer matrix. Alternatively, the alkyl (meth) acrylate-derived polymer grafted nanoparticles can be loaded within the polymer matrix at a relatively low loading, such as greater than 0 to about 5 wt. % of the total weight of the resulting nanocomposite.

EXAMPLES

To prepare poly alkyl methacrylates-grafted nanoparticles, RAFT agent (or CRP agent) anchored nanoparticles were first prepared. In this example, 4-cyanopentanoic acid dithiobenzoate (CPDB) was attached to the silica nanoparticles in a two-step process as shown in FIGS. 1A-1B. First, CPDB was activated by 2-mercaptothiazoline to form activated CPDB.

Then, 3-aminopropyldimethylethoxysilane (varying the ratio of the aminosilane to silica nanoparticles can control the grafting density) was added to colloidal silica nanoparticles (15 nm in diameter, 10 g solution, 30 wt % from Nissan chemical) dispersed in dry THF (40 mL). The reaction mixture was stirred at 75° C. overnight under $N_2$ protection. The solution was precipitated into hexane (300 mL), centrifuged at 3000 rpm for 5 minutes, redispersed in dry THF. The solution was precipitated again into hexane and redispersed in dry THF for further use.

The above amino-functionalized nanoparticles were added slowly to a THF solution of activated CPDB, and the resulting solution was stirred at room temperature overnight. After the reaction, the solution was precipitated into cyclohexane and ethyl ether mixture (200 mL, cyclohexane:ethyl ether=5:1), centrifuged at 3000 rpm for 5 minutes, redispersed in dry THF. The solution was precipitated again into cyclohexane:ethyl ether=5:1 and redispersed in dry THF. This procedure was repeated 2 times until the supernatant solution was colorless after centrifugation.

Figure 2:
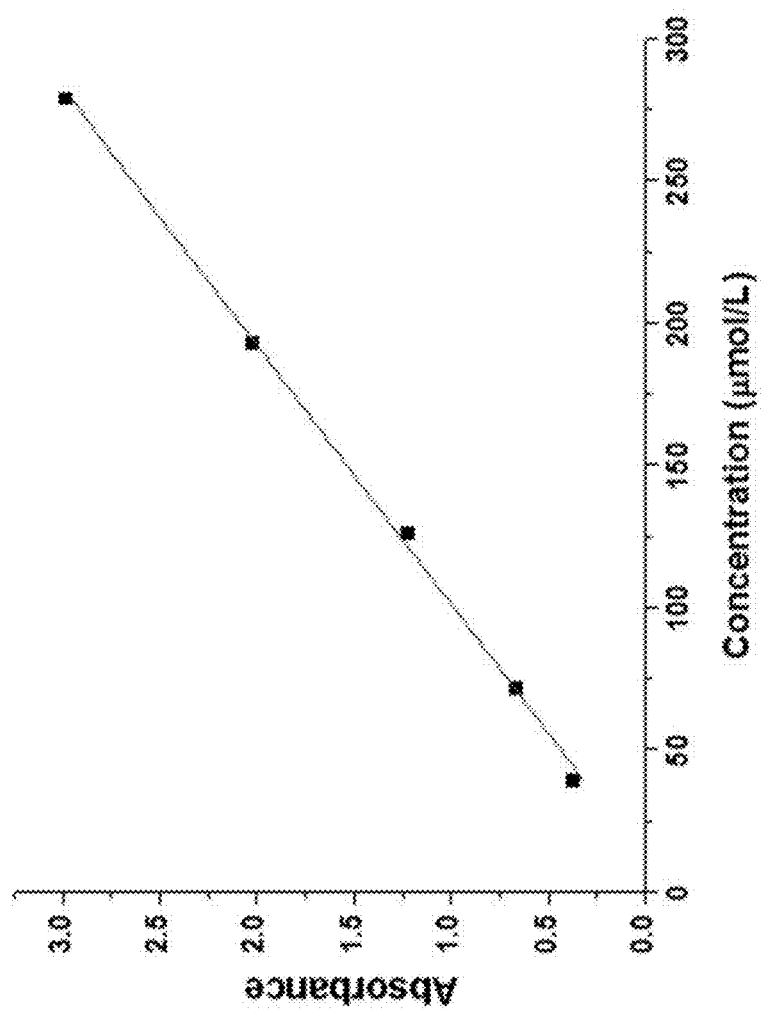
FIG. 2 shows a UV-vis standard absorption curve of CPDB.

Graft Density Test:

The CPDB molecule is UV active; therefore we can compare the absorption at 302 nm from CPDB-g-$SiO_2$ nanoparticles to a standard absorption curve created from a series of known concentrations of free CPDB solutions. This allows easy and accurate measurement and calculation of graft density (see, FIG. 2).

Therefore, an aliquot of the nanoparticles was subjected to UV-vis analysis to determine the graft densities of the coated CPDB on the particle surface. Samples of CPDB-g-$SiO_2$ nanoparticles were synthesized with various grafting densities (0.11 chains/$nm^2$, 0.16 chains/$nm^2$, 0.33 chains/$nm^2$). Due to the living characteristic of RAFT polymerization, it is assumed that the chain densities after polymerization are the same as the graft densities of CPDB.

Example 1: Surface-Initiated RAFT Polymerization of Lauryl Methacrylate

Surface initiated RAFT polymerization of lauryl methacrylate (LMA) was carried out from the surface of the CPDB attached silica nanoparticles with chain density of 0.16 ch/$nm^2$ to form PLMA brush anchored silica nanoparticles. A 50/50 ratio of Toluene/THF was used as the solvent. Azobisisobutyronitrile was used as the initiator and the molar ratio between species of [Monomer]:[CPDB]:[AIBN] =1000:1:0.1. The PLMA chains were cleaved from the silica nanoparticles by dissolving approximately 50 mg of the PLMA-g-$SiO_2$ in 4 mL benzene, 4 mL water, 1 droplet of aliquot and adding 0.3 mL hydrofluoric acid and allowing to stir overnight. Conversion of monomer was determined by $H^1$NMR by comparing the vinyl hydrogens of monomer with those of trioxane which was used as the internal standard. The molecular weight ($M_n$) of the anchored PLMA chains was 208 Kg/mol and the PDI was 1.37 as measured by gel permeation chromatography (GPC) which was calibrated with polymethylmethacrylate standards.

Example 2: Surface-Initiated RAFT Polymerization of Stearyl Methacrylate

Surface initiated RAFT polymerization of stearyl methacrylate (SMA) was carried out from the surface of the CPDB attached silica nanoparticles with chain density of 0.16 ch/$nm^2$ to form PSMA brush anchored silica nanoparticles. A 50/50 ratio of Toluene/THF was used as the solvent. AIBN was used as the initiator and the molar ratio between species of [Monomer]:[CPDB]:[AIBN]=1000:1:0.1. The PSMA chains were cleaved from the silica nanoparticles by dissolving approximately 50 mg of the PSMA-g-$SiO_2$ in 4 mL benzene, mixing the solution with 4 mL water, 1 droplet of Aliquot® 336 and 0.3 mL hydrofluoric acid, and allowing to stir overnight. Conversion of monomer was determined by 1H NMR by comparing the vinyl hydrogens of monomer with those of trioxane which was used as the internal standard. The molecular weight ($M_n$) of the anchored PSMA chains was 140 Kg/mol and the PDI was 1.48 as measured

Figure 3A:
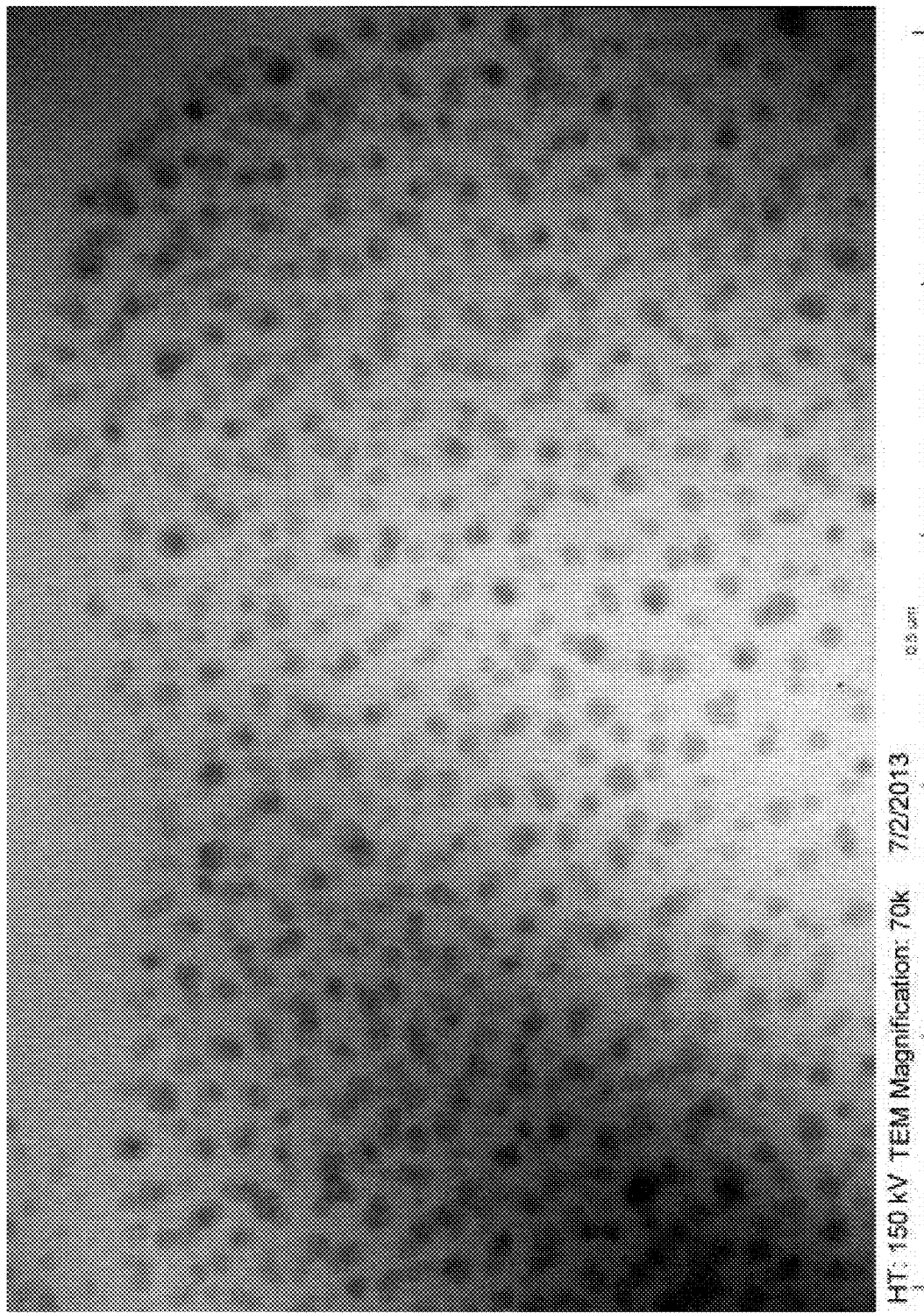
FIG. 3A shows a TEM image of LLDPE nanocomposite filled with PSMA-grafted silica NPs (chain density=0.33 ch/nm$^2$), according to one example.

Example 3: Linear Low Density Polyethylene Nanocomposite Filled with PSMA-Grafted Silica NPs Linear Low density polyethylene (Dowlex 2045.04) was used as the matrix to prepare the nanocomposite. A sample of PSMA-grafted silica NPs ($M_n$=84 k, PDI=1.4, chain density=0.33 ch/nm$^2$) was synthesized and a 50 mg/ml THF solution was prepared. To make the 2 wt % nanocomposite, 100 mg LLDPE was added to 10 ml toluene and heated to 100° C. to dissolve the polymer. Then 0.04 ml of PSMA-grafted silica NPs solution was added to the solution, stirring for 10 min. Solution was drop-casted on the glass and let to dry for 2 hrs. Annealing was done at 110° C. for 1 hr. After cooling, nanocomposite film was peeled off and prepared for TEM analysis. TEM image of resulting nanocomposite also shows a good dispersion of NPs through the matrix (See, FIG. 3a).

Figure 3B:
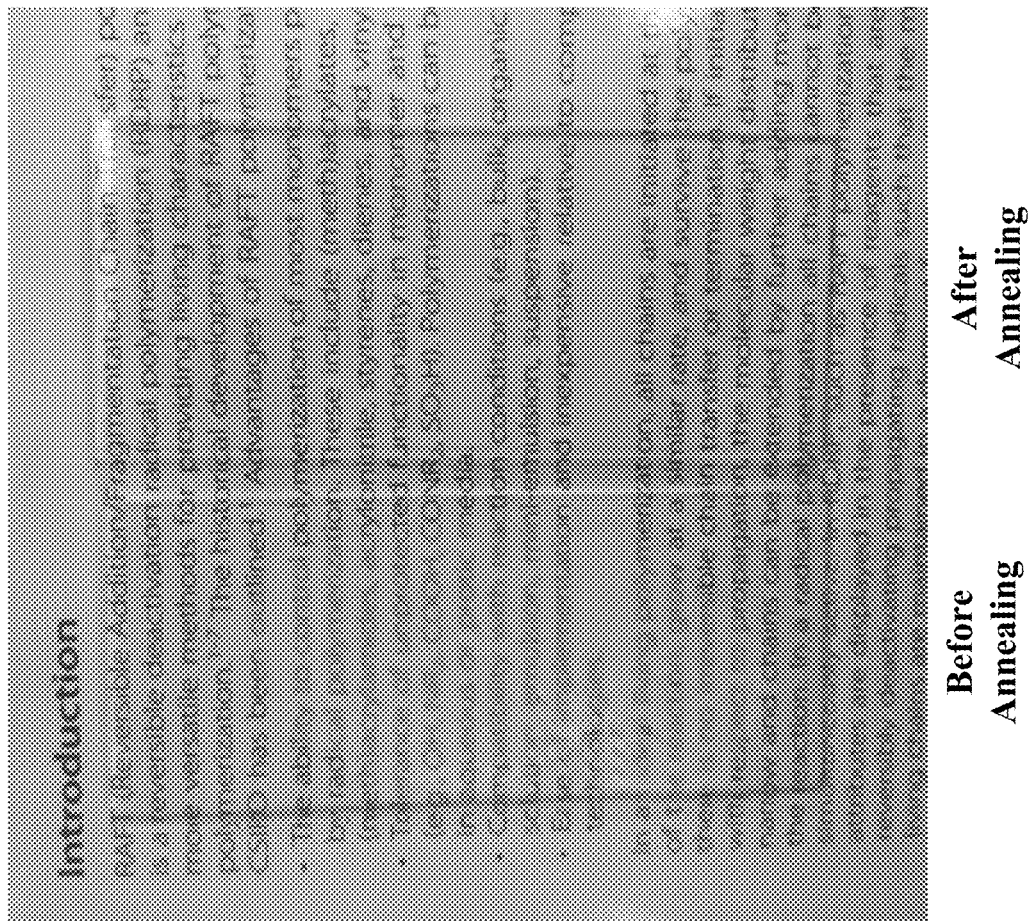
FIG. 3B shows images of casted nanocomposite films on the glass before and after annealing at 100° C., according to one example.

FIG. 3b shows the casted nanocomposite film on the glass (before on the left) and after annealing (on the right). It is not completely transparent before annealing, but transparency improves after annealing, indicating that stearyl methacrylate brushes on the NPs are compatible with the matrix and the annealing process can enhance the interactions between each other.

Figure 4A:
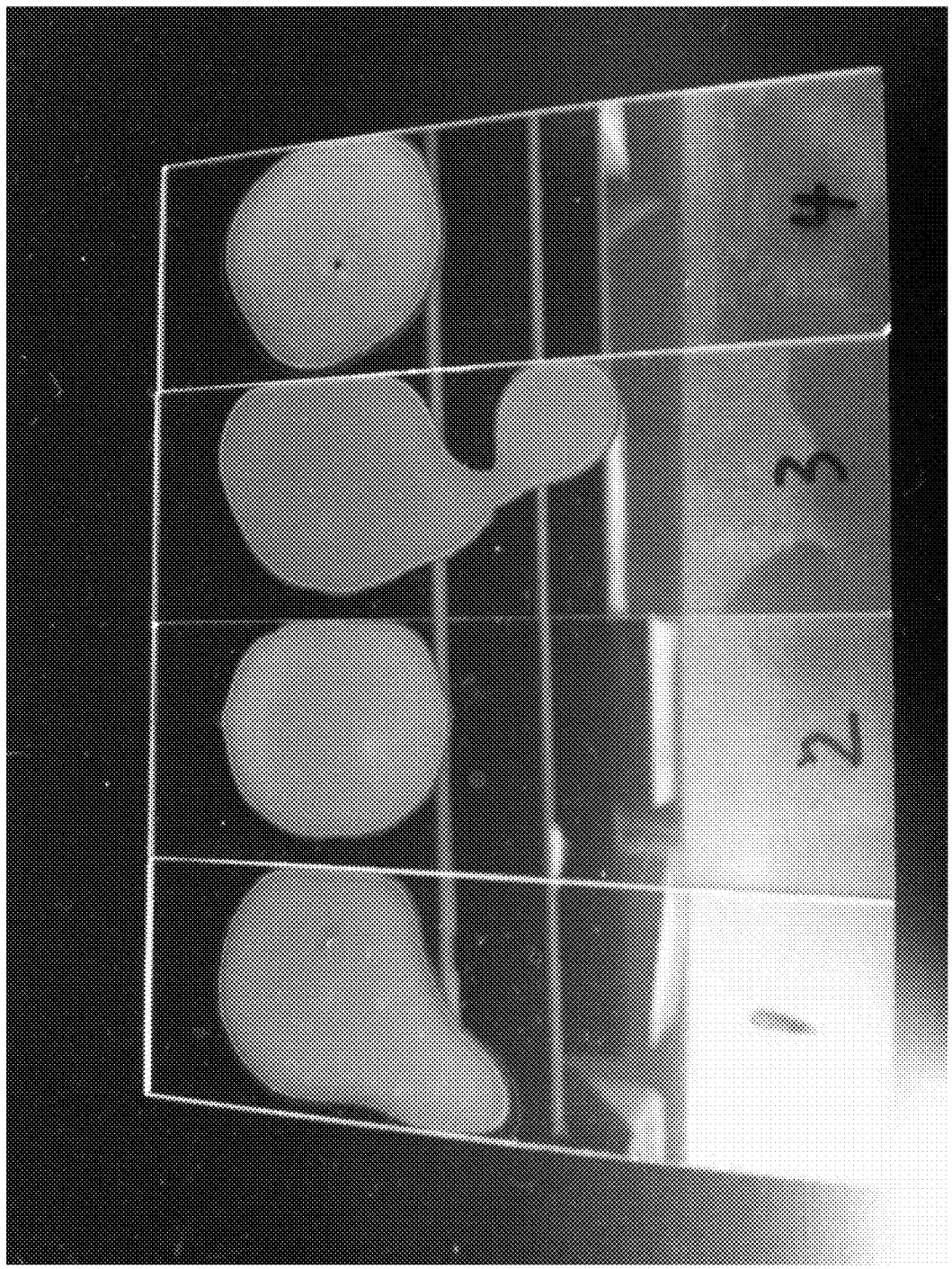
FIGS. 4A and 4B show SPP films before (FIG. 4A) and after (FIG. 4B) annealing (film 1: Neat SPP; film 2: SPP with 1 wt % PSMA-NP 1; film 3: SPP with 1 wt % PSMA-NP 2; film 4: SPP with 2 wt % PSMA-NP 1; film 5: SPP with 2 wt % PSMA-NP 2; film 6: SPP with 5 wt % PSMA-NP 1; film 7: SPP with 5 wt % PSMA-NP 2), according to one example.
Figure 4B:
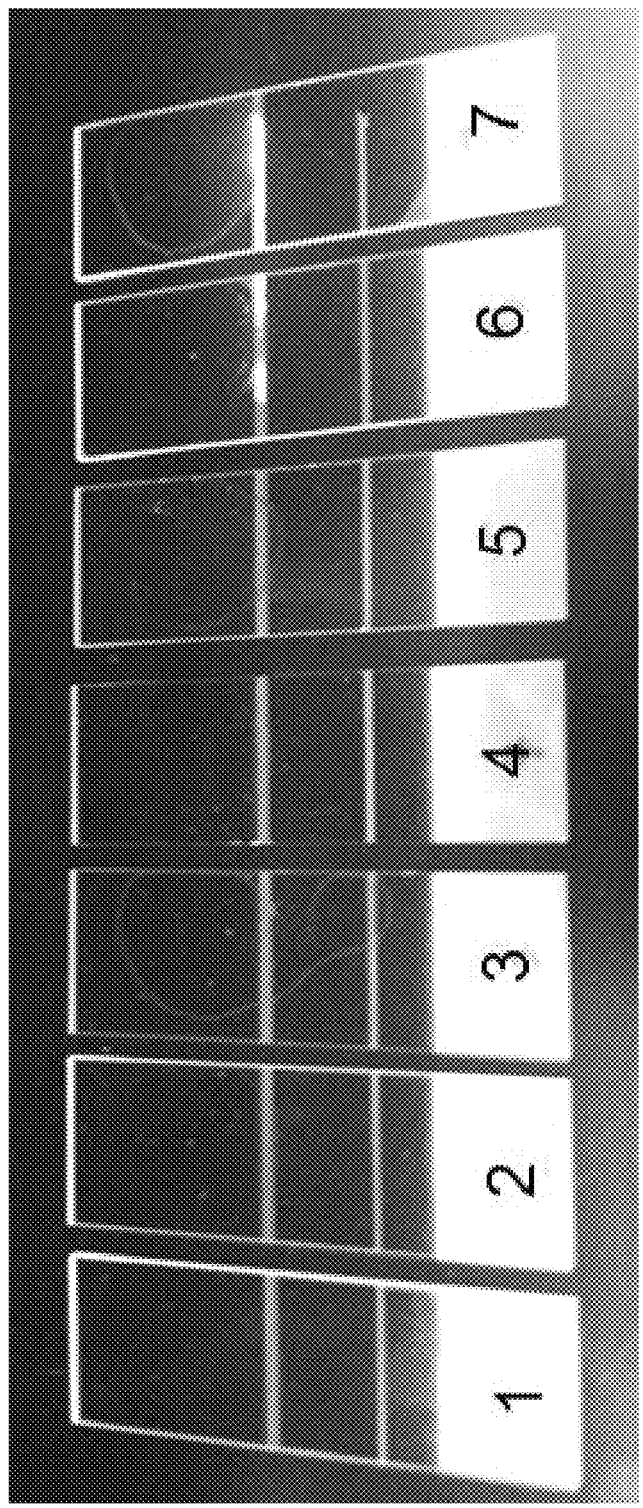

Example 4: Syndiotactic Polypropylene Nanocomposite Filled with PSMA-Grafted Silica NPs Two samples of PSMA-grafted silica NP's (Table 1) were mixed with syndiotactic polypropylene (SPP) following the procedure: a sample of PSMA-g-SiO$_2$ was dissolved in toluene to prepare 10 mg/mL solution, 100 mg SPP was added to 10 ml toluene and heated to 90° C. to dissolve the polymer, and then opaque films were obtained with different nanoparticle loadings by adding PSMA-g-SiO$_2$ solution into the SPP solution, casting films on glass slides and evaporating solvent. After half an hour of annealing at 110° C. and cooling to room temperature, similar transparent films as the LLDP nanocomposites were obtained for all the samples (FIG. 4A-4B), indicating that PSMA-NPs were miscible in SPP matrices without agglomeration.

TABLE 1

Samples of PSMA-grafted silica NP's for PP modification

|  | Mn | PDI | Graft density |
|---|---|---|---|
| PSMA-NP 1 | 138,047 | 1.37 | 0.68 chains/nm$^2$ |
| PSMA-NP 2 | 111,453 | 1.40 | 0.03 chains/nm$^2$ |

Example 5: Melt-Mixed Linear Low Density Polyethylene Nanocomposite Filled with PSMA-Grafted Silica NPs Linear Low density polyethylene (Dowlex 2045.04) was used as the matrix to prepare the nanocomposite. A sample of PSMA-grafted silica NPs (Mn=159 k, PDI=1.7, chain density=0.14 ch/nm2) was synthesized with the same method as in Example 2. 4 wt % and 9 wt % nanocomposites (based on core silica) were prepared by mixing LLDPE and PSMA grafted silica NPs in the melt using a twin screw DSM microcompounder at 170° C. for 5 min. The resulting nanocomposite was melt compressed for 1 minute to give a thin 0.2 mm film. Dogbone tensile test specimens were cut and used for mechanical tests on an Instron 5543A instrument. The 4 wt % composite showed the modulus of 270 MPa and "elongation at break" of 716%. The 9 wt % composite showed the modulus of 311 MPa and elongation at break of 519%. The modulus and elongation at break for unfilled LLDPE processed in a similar manner was also tested which were 231 MPa and 721%, respectively.

Example 6: Surface-Initiated RAFT Co-Polymerization of Stearyl Methacrylate with Methyl Methacrylate and their Melt-Mixed Nanocomposite with LLDPE Surface initiated RAFT co-polymerization of stearyl methacrylate (SMA) and methyl methacrylate (MMA) was carried out from the surface of the CPDB attached silica nanoparticles with chain density of 0.14 ch/nm$^2$ to form random co-poly(MMA$_{0.5}$-SMA$_{0.5}$) brush anchored silica nanoparticles (polymer chains randomly contain 50% of SMA and 50% of MMA). THF was used as the solvent and AIBN as the initiator and the molar ratio between species of [Monomer]:[CPDB]:[AIBN]=1000:1:0.1. The molecular weight ($M_n$) of the anchored copolymer chains was 94 Kg/mol and the PDI was 1.2 as measured by gel permeation chromatography (GPC) which was calibrated with poly (methyl methacrylate) standards.

Co-poly(MMA-SMA) grafted silica particles were melt-mixed with LLDPE matrix in a twin screw DSM microcompounder at 170° C. for 5 min to give 2 wt % and 4 wt % filled nanocomposites. The resulting nanocomposites were melt compressed for 1 minute to give a thin 0.2 mm film. Dogbone tensile test specimens were cut and used for mechanical tests on an Instron 5543A instrument. The 4 wt % composite showed the modulus of 257 MPa and "elongation at break" of 716%. The 2 wt % composite showed the modulus of 265 MPa and elongation at break of 712%. The modulus and elongation at break for unfilled LLDPE processed in a similar manner was also tested which were 231 MPa and 721%, respectively.

These and other modifications and variations to the present invention may be practiced by those of ordinary skill in the art, without departing from the spirit and scope of the present invention, which is more particularly set forth in the appended claims. In addition, it should be understood the aspects of the various embodiments may be interchanged both in whole or in part. Furthermore, those of ordinary skill in the art will appreciate that the foregoing description is by way of example only, and is not intended to limit the invention so further described in the appended claims.

What is claimed:

1. A method of synthesizing a composite, the method comprising:
   covalently bonding a plurality of an anchoring compound to a nanoparticle;
   covalently bonding a plurality of reversible addition-fragmentation chain-transfer (RAFT) agents to the anchoring compounds bonded to the nanoparticle, each of the RAFT agents being bonded to each one of the anchoring compounds;
   polymerizing a stearyl methacrylate monomers to each one of the RAFT agents bonded to the anchoring compounds in a solvent solution comprising a mixture of solvents to form a graft-modified nanoparticle that includes a plurality of poly(stearyl methacrylate)

(PSMA) polymer chains bonded to the nanoparticle, each of the PSMA polymer chains being bonded to each one of the RAFT agents via direct bonding between a terminal stearyl methacrylate of the PSMA polymer chain and the RAFT agent, the PSMA polymer chains consisting of PSMA polymer chains having a number average molecular weight of from 84,000 to 140,000 that are grafted to the nanoparticle at a chain density of from 0.11 chains per $nm^2$ to 0.7 chains per $nm^2$;

following the polymerization step, combining a plurality of the thus produced graft-modified nanoparticles with a polypropylene or a polyethylene to form a mixture; and solution casting or melt-forming the mixture to form the composite of a polypropylene or polyethylene matrix with the plurality of the graft-modified nanoparticles dispersed therein without gross agglomeration of the nanoparticles within the polypropylene or polyethylene matrix.

2. The method of claim 1, further comprising deactivating the PSMA polymer chains following the polymerization.

3. The method of claim 1, wherein the polymerization step is performed at a reaction temperature of about 60° C. to about 100° C.

4. The method of claim 1, wherein each one of the anchoring compounds is covalently bonded to each of the RAFT agents via reaction of an amine group of each one of the anchoring compounds.

5. The method of claim 1, wherein the anchoring compound comprises a silane, a phosphate, a phosphate ester, a phosphonate, a phosphonate ester, or a carboxylic acid group.

6. The method of claim 1, wherein the RAFT agents are 4-cyanopentanoic acid dithiobenzoate (CPDB).

7. The method of claim 6, further comprising:

prior to covalently bonding each of the plurality of RAFT agents to each one of the anchoring compounds, reacting the CPDB with 2-mercaptothiazoline to form an activated CPDB.

8. The method of claim 1, wherein the RAFT agent comprises a xanthate, a dithioester, a dithiocarbamate, or a trithiocarbonate.

9. The method of claim 1, the mixture of solvents comprising a mixture of toluene and tetrahydrofuran.

10. A composite, comprising:

a polypropylene or polyethylene matrix;

a plurality of nanoparticles dispersed within the polypropylene or polyethylene matrix without gross agglomeration of the nanoparticles within said matrix, wherein each one of the nanoparticles defines a surface and includes a plurality of poly(stearyl methacrylate) (PSMA) polymer chains bonded to the surface of the nanoparticle, each one of the PSMA polymer chains being bonded to the nanoparticle surface via an anchoring compound and a reversible addition-fragmentation chain-transfer (RAFT) agent, the anchoring compound being covalently bonded to the surface of the nanoparticle, the RAFT agent being covalently bonded to the anchoring compound, and a terminal stearyl methacrylate of each of the PSMA polymer chains being directly bonded to the RAFT agent, the plurality of PSMA polymer chains consisting of PSMA polymer chains having a number average molecular weight of from 84,000 to 140,000 that are grafted to the nanoparticle surface at a chain density of from 0.11 chains per $nm^2$ to 0.7 chains per $nm^2$.

11. The composite of claim 10, wherein the RAFT agent comprises CPDB.

12. The composite of claim 10, wherein the RAFT agent comprises a xanthate, a dithioester, a dithiocarbamate, or a trithiocarbonate.

13. The composite of claim 10, the composite comprising the plurality of nanoparticles in an amount of from about 25 wt. % to about 60 wt. % of the composite.

* * * * *